US005357606A

United States Patent [19]

Adams

[11] Patent Number: 5,357,606

[45] Date of Patent: Oct. 18, 1994

[54] ROW INTERLEAVED FRAME BUFFER

[75] Inventor: Dale R. Adams, San Jose, Calif.

[73] Assignee: Apple Computer, Inc., Cupertino, Calif.

[21] Appl. No.: 842,852

[22] Filed: Feb. 25, 1992

[51] Int. Cl.[5] .............................................. G06F 15/62

[52] U.S. Cl. ...................................... 395/164; 345/201

[58] Field of Search ................................ 395/121–122, 395/162, 164, 165, 166; 340/798–800; 345/187, 201

[56] References Cited

U.S. PATENT DOCUMENTS

| | | | |
|---|---|---|---|
| 4,609,917 | 9/1986 | Shen | 395/121 |
| 4,985,848 | 1/1991 | Pfeiffer et al. | 395/164 |
| 5,142,276 | 8/1992 | Moffat | 340/799 |

FOREIGN PATENT DOCUMENTS

| | | | |
|---|---|---|---|
| 2159308 | 11/1985 | United Kingdom | G09F 15/16 |
| 2243519 | 10/1991 | United Kingdom | G06G 1/16 |
| 8800751 | 1/1988 | World Int. Prop. O. | G09G 1/16 |

*Primary Examiner*—Dale M. Shaw
*Assistant Examiner*—Kee M. Tung
*Attorney, Agent, or Firm*—V. Randall Gard

[57] ABSTRACT

A frame buffer operating in fast page access mode with improved performance for operations such as scrolling and moving which typically access different display memory rows. The present invention utilizes a row/-bank interleaved scheme of multiple display memory banks in the frame buffer such that each display memory bank supports a different set of non-contiguous display rows thus increasing the odds of display memory access in-page hits and decreasing the odds of display memory access in-page misses.

9 Claims, 6 Drawing Sheets

ROW INTERLEAVED FRAME BUFFER

FIELD OF THE INVENTION

The present invention relates to the field of computers, displays and the mechanisms by which display information is generated and stored. More specifically, the present invention relates to a processor's access bandwidth into frame buffer display memory.

BACKGROUND OF THE INVENTION

As computer display sizes increase and as frame buffer pixel depths increase frame buffer memory access bandwidth becomes a constraining factor in how quickly a given image can be altered and re-displayed. Computer graphics operations such as scrolling, area clearing and filling, and moving one area of the display to another are all graphics operations which are limited by a processor's access bandwidth into frame buffer memory. Furthermore, these operations are typically performed very frequently, for example, scrolling a document in a word processor, spreadsheet or graphics program; moving a window on a display; clearing or filling an area whenever a window is partially or completely redrawn; and, filling or clearing rectangular areas whenever a menu is pulled down.

Still further, due to the length of time required for these graphics operations in many current frame buffer designs, and due to the frequency of their use, these types of operations have a great affect on the perceived speed of the computer as a whole for most users. This is especially true with 24 to 32 bits per pixel modes because the amount of memory to be moved in these operations is proportional to the frame buffer pixel depth.

Using a fast page access mode (a feature commonly known in the art) substantially reduces the average access time of frame buffer memory so long as most accesses are in-page hits. Whether most frame buffer memory accesses are in-page hits depends generally, however, upon the particular graphics operations being performed.

Some operations that benefit from frame buffer memory fast page access mode are clear and fill operations and operations which transfer data from an offscreen pixel map. These operations usually benefit from frame buffer memory fast page mode accesses because these operations tend to perform a sequence of consecutive memory write cycles to the same page in the frame buffer memory. (Note that a page in frame buffer memory is generally synonymous with a row in frame buffer memory but may correlate to only a portion of a display row, as is well known in the art.) Because frame buffer memory structure usually aligns Video Random Access Memory (VRAM) pages on display lines 5or rows, the above mentioned operations result in a series of in-page hits to the frame buffer memory, thus reducing the average frame buffer memory access time. Therefore, operating the frame buffer in fast page access mode generally helps these types of graphics operations.

Graphics operations which merely modify data in the frame buffer memory typically perform a sequence of read/modify/write cycles to the same memory location and hence tend to operate on the same page in the frame buffer memory. Thus these operations can also benefit from the use of fast page access mode.

However, scrolling or moving a section of display memory is typically implemented via a series of read/-write cycles (i.e., repetitively read a word from a source location then write it to a destination location in the frame buffer memory). In most cases, the read access occurs in a different VRAM memory page (i.e., a different row of pixel information in the frame buffer memory) than the write cycle, effectively causing an in-page miss for every frame buffer memory access. In this case, operating the frame buffer in fast page access mode would generally degrade performance. There are other instances in which this is also the case, such as generating and displaying steep lines.

With techniques of the prior art, as has been explained, there are some operations which are helped by fast page access mode operation, and some operations which are hindered.

SUMMARY AND OBJECTS OF THE INVENTION

An objective of the present invention is to provide an improved technique for storing and accessing display data which provides for greater processor to display data memory access bandwidth.

An objective of the present invention is to provide an improved apparatus for storing and accessing display data which provides for greater processor to display data memory access bandwidth.

The foregoing and other advantages are provided by a frame buffer access method in a computer system comprising a processor, X banks of display memory means and a display means having Y display rows, said frame buffer access method comprising accessing the data corresponding to the Nth display row of said display means by accessing bank N modulo X of said display memory means.

The foregoing and other advantages are provided by a frame buffer in a computer system having a display means, said display means having X display rows, said frame buffer comprising Y banks of display memory wherein when said computer system accesses said display memory associated with the Nth row of said X display rows of said display means the Nth bank modulo Y of said Y banks of display memory is accessed.

The foregoing and other advantages are also provided by a frame buffer in a computer system having a display means, said improved frame buffer comprising said display means having multiple display lines, multiple banks of display memory wherein each said display memory bank provides display data for a different non-contiguous set of said display lines of said display means, and separate display memory access logic for each said display memory bank.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
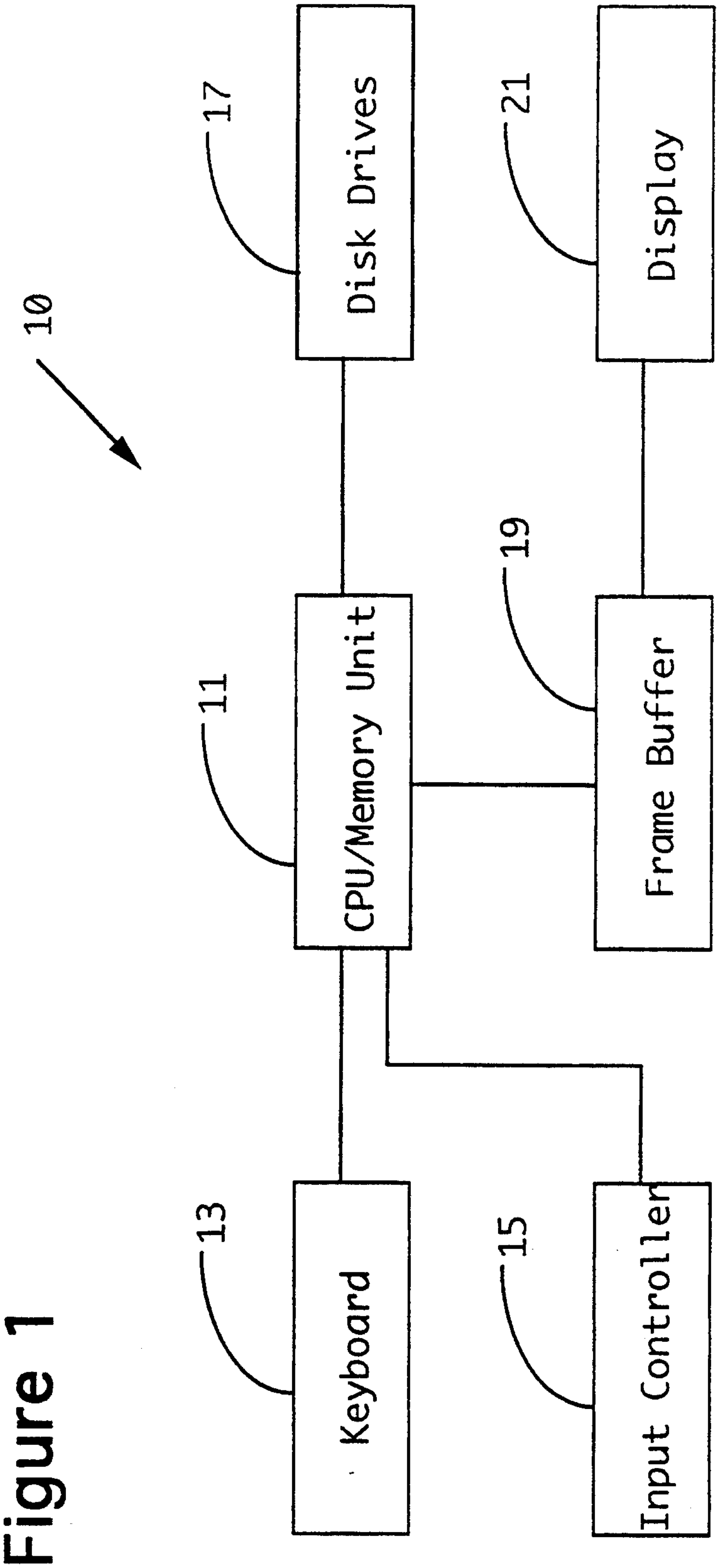
FIG. 1 is a generalized block diagram of an example computer system of the present invention.

The present invention generally involves a high access bandwidth frame buffer and it would be helpful to provide a brief description of a pertinent computer environment. FIG. 1 is an generalized block diagram of an appropriate computer system 10 which includes a CPU/memory unit 11 that generally comprises a microprocessor, related logic circuitry and memory circuits. A keyboard 13 provides input to the CPU/memory unit 11, as does input controller 15 which by way of example can be a mouse, trackball, joystick, etc. Disk drives 17, which can include fixed disk drives, are used for mass storage of programs and data. Display output is provided to display means 21, which may comprise a video monitor, liquid crystal display, etc., via frame buffer 19.

Figure 2:
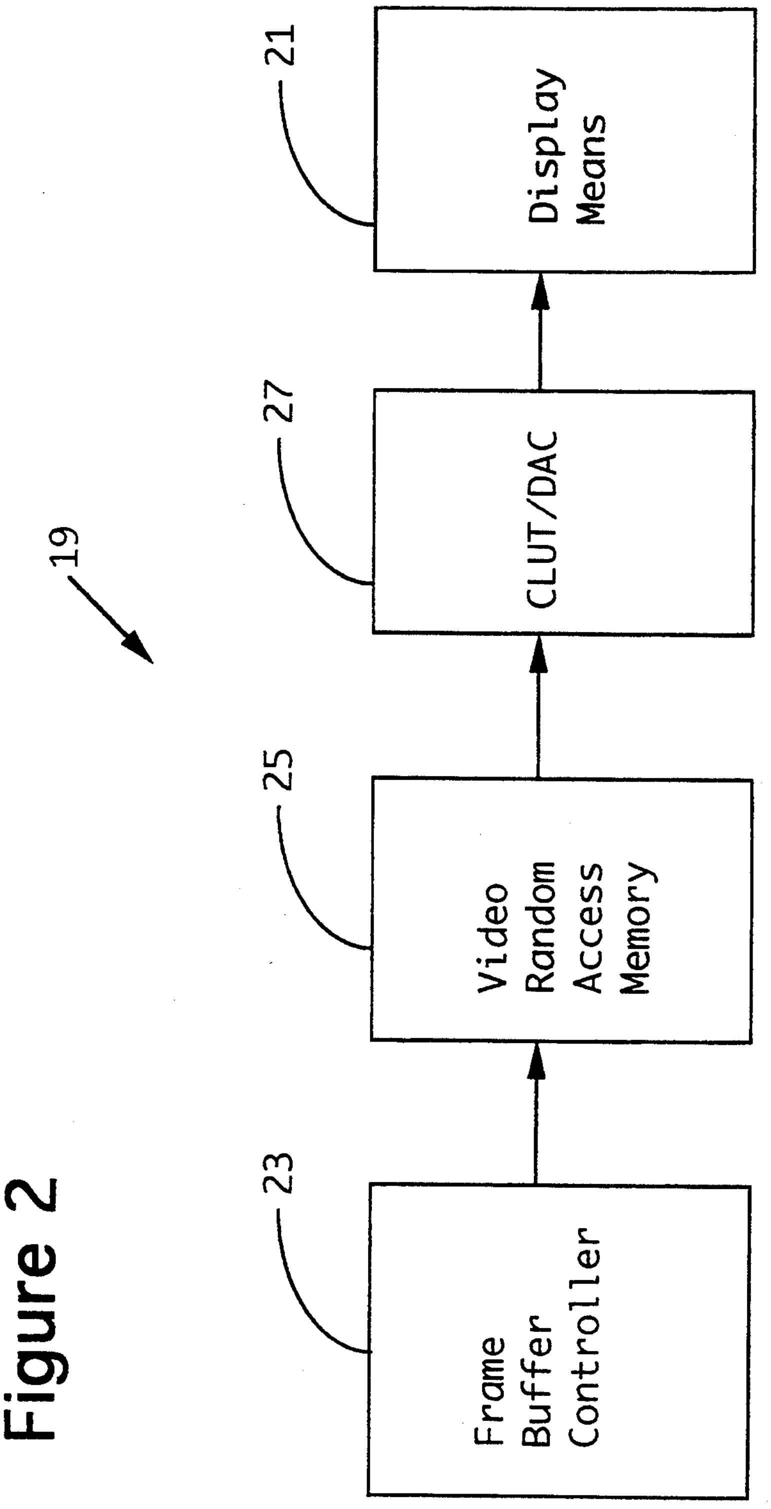
FIG. 2 is a more detailed block diagram of the frame buffer and display means of the present invention.

Referring now to FIG. 2, a more detailed diagram of frame buffer 19 and display means 21 can be seen. Frame buffer 19 generally comprises frame buffer controller 23, Video Random Access Memory (VRAM) 25 and Color Look-Up Table/Digital-to-Analog Converter (CLUT/DAC) 27. Frame buffer controller 23 receives signals from CPU/memory unit 11 (of FIG. 1) and in turn controls the operation and contents of VRAM 25. VRAM 25 is dual ported memory: one port is accessible via a system bus (either directly or Via frame buffer controller 23) while another port is used to output data to display means 21. Thus, specified portions of the contents of VRAM 25 pass through CLUT/DAC 27 (which may also provide gamma correction functions), if necessary, to display means 21. Such techniques are well known in the art.

Figure 3:
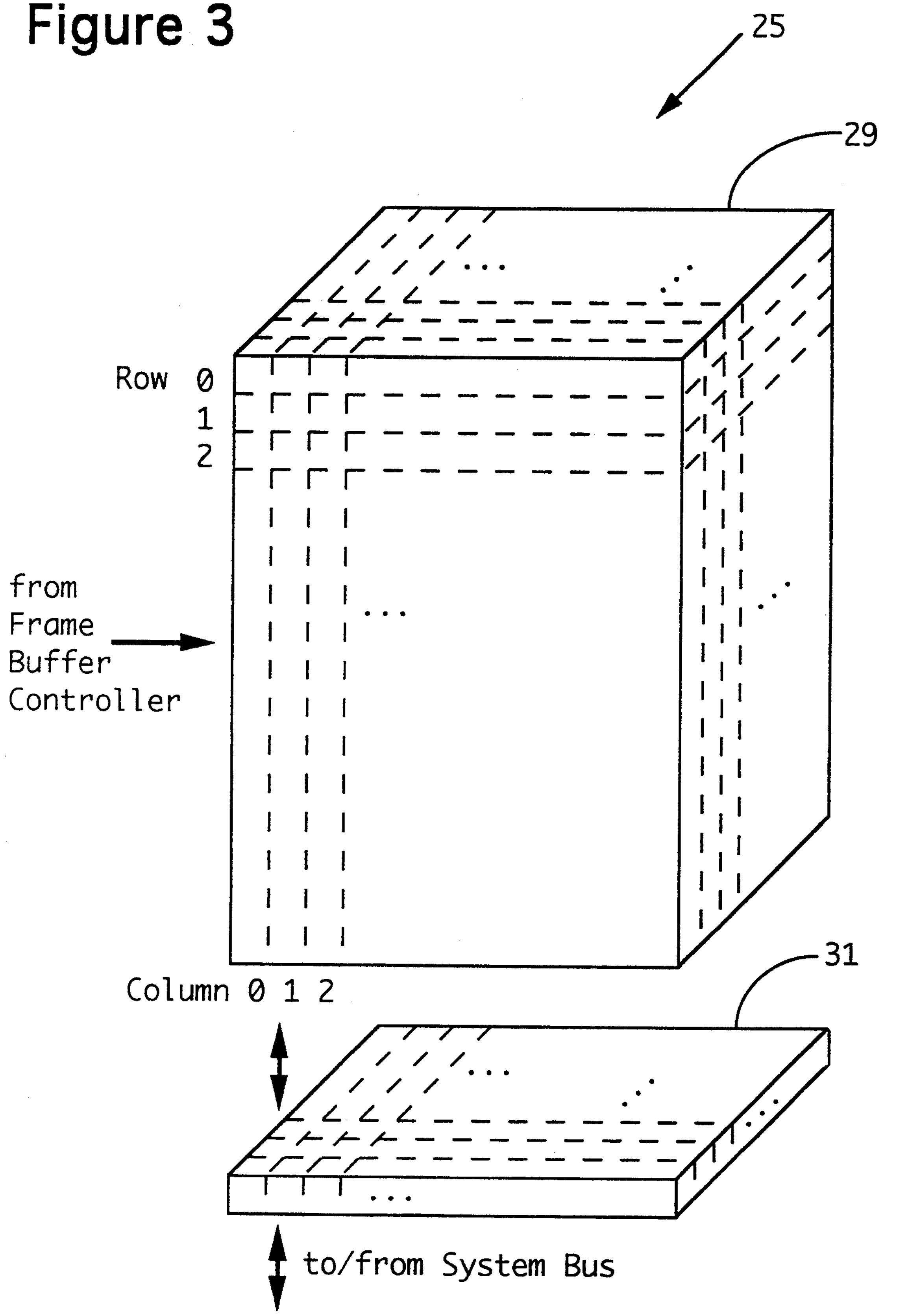
FIG. 3 is a more detailed diagram of Video Random Access Memory (VRAM)

Referring now to FIG. 3, VRAM 25 will be more fully explained. VRAM 25 may be viewed as a block, or bank, of memory 29 with a given number of bits in width (generally equal to or greater than the number of pixels per horizontal line/row of display means 21), height (generally equal to or greater than the number of pixels per vertical line/column of display means 21) and depth (generally the number of bits per pixel, commonly known as pixel depth), as is explained more fully below.

When it is desired to either read to or write from VRAM 25, frame buffer controller 23 receives such command from CPU/memory 11 and in turn sends the appropriate address, Row Address Strobe (RAS), and Column Address Strobe (CAS) signals to VRAM 25. The RAS signal causes the image data in the appropriate page (as was explained above, the term page refers to a VRAM row, hence the term row address strobe and not page address strobe) of memory block 29 of VRAM 25 to be copied into sense amps 31 and the CAS signal causes the appropriate column of pixel data copied into sense amps 31 to be selected, its is explained more fully below. Note that each page of memory block 2 of VRAM 25 (which correlates to some portion of one row of display means 21) can be configured as a given number of bits in depth so as to provide more detailed pixel information (e.g., black and white grey-scale, color) for each pixel of display means 21. In the preferred embodiment of the present invention VRAM 25 is organized in pages which are 256 long words (or 256 pixels because each pixel is 32 bits deep) in length.

Figure 4:
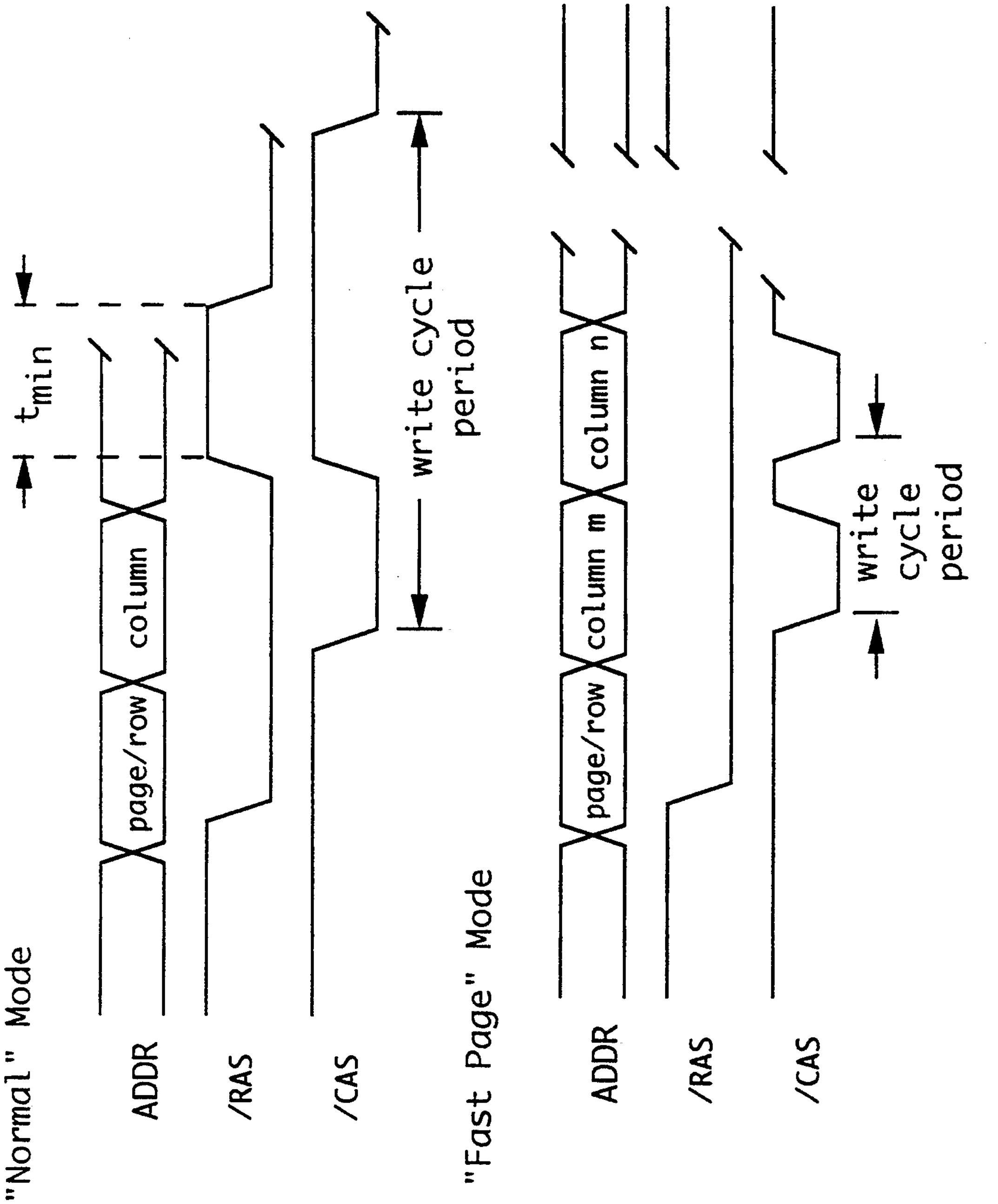
FIG. 4 is a timing diagram of both a "normal" VRAM access and a "fast page mode" VRAM access.

Referring now to FIG. 4, the timing of a "normal" frame buffer access will first be explained. When CPU/memory unit 11 issues a read or write command to frame buffer 19, frame buffer controller 23 receives the command, decodes the address and sends the page (VRAM row) address to VRAM memory block 29 as is indicated by the ADDR signal. A /RAS signal (note that "/" denotes an active low signal) is then sent by frame buffer controller 23 to VRAM memory block 29 which causes the entire addressed page to be copied from VRAM memory block 29 to sense amps 31. A /CAS signal is then sent by frame buffer controller 23 to VRAM memory block 29 to select the specific sense amp(s) 31, and hence column desired, from the page already selected by the earlier sent /RAS signal.

In the case of writing to frame buffer 19, the data is written to the selected sense amps 31 when the /CAS signal is issued (activated). The data in sense amps 31 is then written to the page memory locations in VRAM memory block 29 when the /RAS signal goes inactive. A write cycle period (the shortest period of time in which one write operation can complete and a subsequent write operation can commence) is denoted for a normal frame buffer access in FIG. 4. It is this write cycle period that can be reduced when using a fast page mode access feature.

Frame buffer VRAM 25 of the present invention utilizes the fast page access mode feature for quickly accessing multiple column locations in the same VRAM 25 page. In fast page mode, as is explained more fully below, the initial VRAM 25 access to a page occurs as a standard or normal VRAM 25 access. However, at the end of the read or write cycle /RAS remains active. As long as consecutive VRAM 25 accesses are within the same page the VRAM 25 access time is significantly reduced because only the additional column address(es) need be supplied.

Referring again to FIG. 4, the timing sequence of a "fast page mode" access will now be explained. When CPU/memory unit 11 issues a read or write command to frame buffer 19, frame buffer controller 23 receives the command, decodes the address and sends the page (VRAM row) address to VRAM memory block 29 as is indicated by the ADDR signal. A /RAS signal is then sent by frame buffer controller 23 to VRAM memory block 29 which (like a normal VRAM access) causes the entire addressed page to be copied from VRAM memory block 29 to sense amps 31. A /CAS signal is then sent by frame buffer controller 23 to VRAM memory block 29 to select the specific sense amp(s) 31, and hence column desired, from the page already selected by the earlier sent /RAS signal.

In the case of writing to frame buffer 19 when using the fast page access mode feature, after the first /CAS signal has been activated and deactivated (hence the sense amps 31 have been read from or written to) then VRAM 25 is available for another transaction. The frame buffer controller 23, having stored the address of the page (VRAM row) currently held in sense amps 31, then decodes the next page (VRAM row) and column address. If the new page (VRAM row) address is the same as the previous page (VRAM row) address then a fast page mode access can occur and hence data already held in sense amps 31 can immediately be written to or read from. Thus, the /RAS signal remains enabled (active) and another /CAS signal can immediately be issued. In this way the time from one write cycle to the next write cycle is greatly reduced by using the fast page mode feature when sequential operations occur on the same page in VRAM memory block 29, as can be seen by the shortened write cycle period of FIG. 4. Note that both normal frame buffer accesses and fast page mode frame buffer accesses are features/techniques well known in the art.

As was stated above, when sequential operations do not occur on the same page in VRAM memory block 29 performance can become degraded if the fast page mode feature is enabled. This performance degradation is caused by an "in-page miss" which occurs when the operation to be performed is not on the frame buffer page currently held in sense amps 31. An in-page miss requires a new page (VRAM row) address be decoded by frame buffer controller 23, taking the /RAS signal inactive, and generating a new /RAS signal (a period of time denoted $t_{min}$ in the figure) before the next /CAS signal can be issued. It is this in-page miss /RAS signal generation delay (which could have been at least partially completed during the prior /CAS read or write cycle of a normal frame buffer access) which causes fast page mode operation to degrade performance when sequential accesses are not to the same page of VRAM 25. Further, it is the likelihood of incurring an in-page miss, thus causing performance degradation, which the present invention seeks to reduce or avoid.

Figure 5:
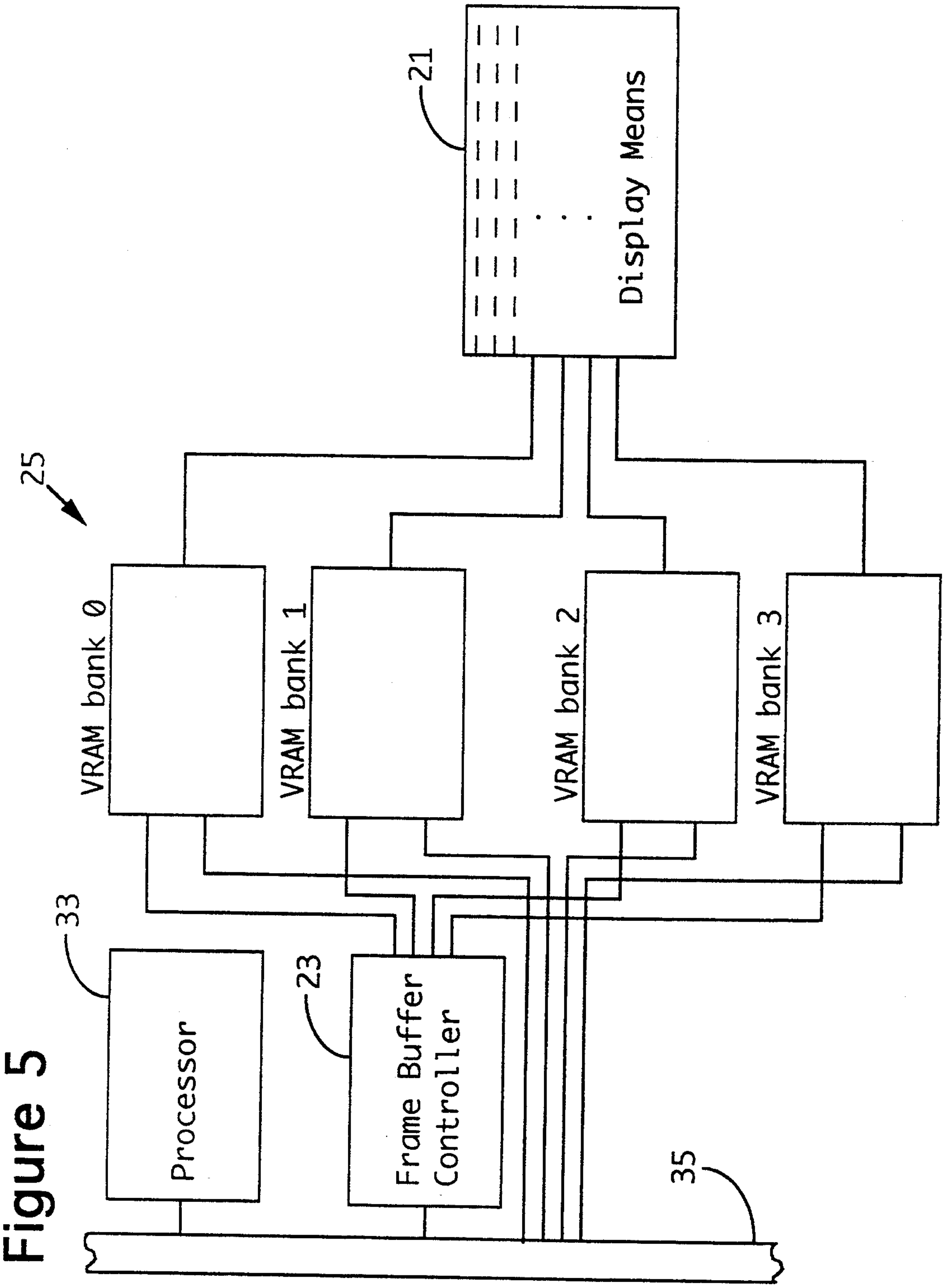
FIG. 5 is a more detailed block diagram of the frame buffer VRAM configuration of the present invention.

The improved frame buffer of the present invention will now be explained with reference to FIG. 5. In the present invention, VRAM 25 is divided into separate memory banks (each with its own set of sense amps 31, not shown in the figure) each separately controlled by frame buffer controller 23 which is controlled by processor 33 communicating across system bus 35. Please note that processor 33 and system bus 35 are elements of CPU/memory unit 11 and the interconnects shown between the various components in FIG. 1.

More specifically, not only is VRAM 25 sub-divided into separate memory banks, but each VRAM 25 memory bank supports a different set of non-contiguous display lines/rows of display means 21. Supporting display lines/rows of display means 21 with separate banks of VRAM 25 memory increases the odds of incurring in-page hits (and avoiding in-page misses) with accesses made to different display lines/rows of display means 21.

Figure 6:
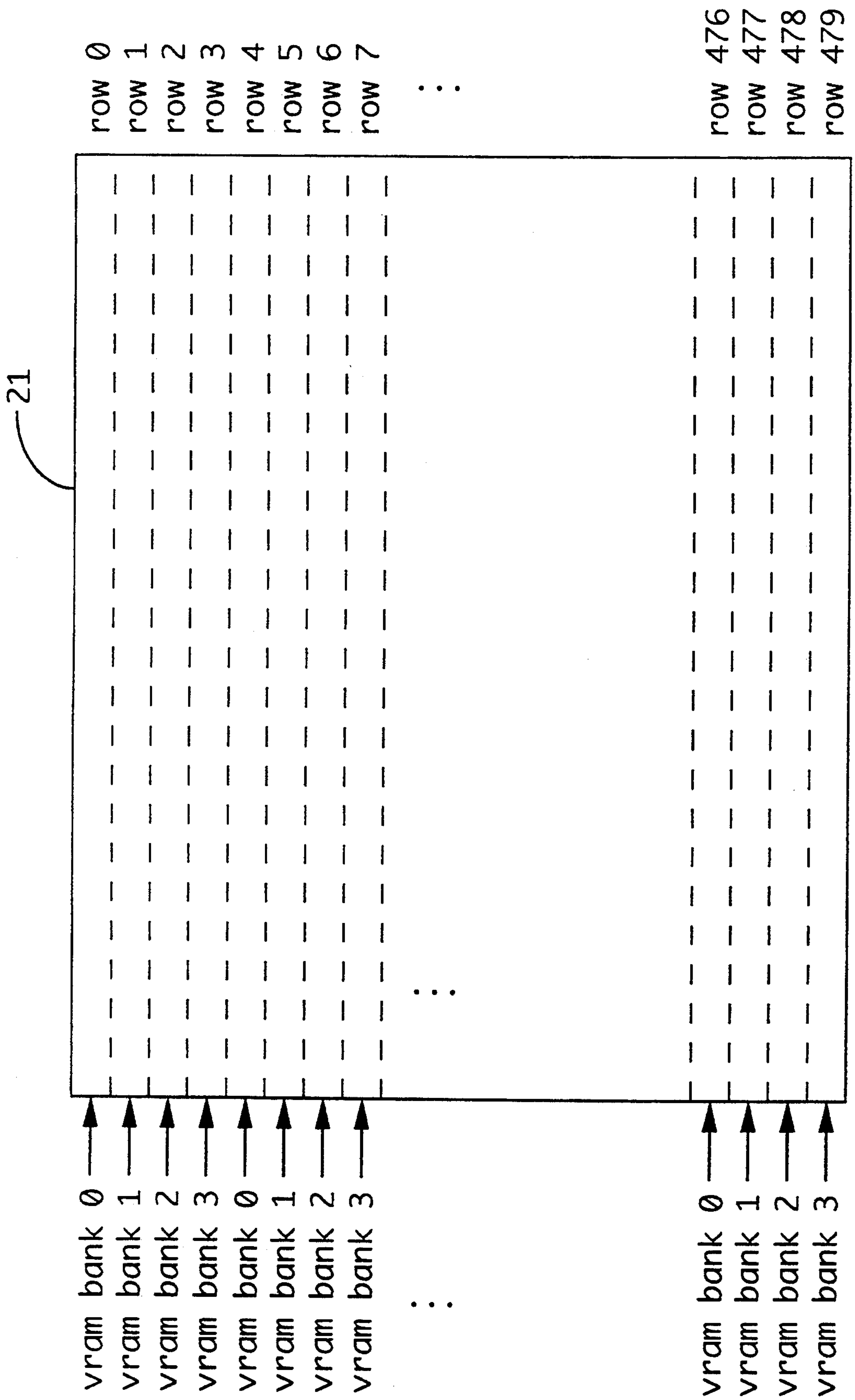
FIG. 6 is a more detailed block diagram of the display means of the present invention depicting the relationship between separate VRAM banks and display means display rows.

The frame buffer VRAM 25 row/bank interleaving scheme of the present invention operates such that row N of display means 21 is driven by VRAM 25 bank N modulo the total number of VRAM banks. The preferred embodiment of the present invention uses four separate VRAM 25 banks (denoted VRAM bank 0, 1, 2 and 3 in the figure) of 512K bytes (each arranged as 1024 long words by 128 bits). As such, in the preferred embodiment of the present invention, row N of display means 21 (having a resolution of 640×480 pixels with 32 bits per pixel) is driven by VRAM 25 bank N modulo 4. In this way, as can be seen with reference to FIG. 6, with display means 21 of the preferred embodiment of the present invention having 480 rows, rows 0, 4, 8, 12, . . . and 476 of display means 21 are driven by VRAM bank 0, rows 1, 5, 9, 13, . . . and 477 of display means 21 are driven by VRAM bank 1, rows 2, 6, 10, 14, . . . and 478 of display means 21 are driven by VRAM bank 2, and rows 3, 7, 11, 15, . . . and 479 of display means 21 are driven by VRAM bank 3.

Furthermore, in the preferred embodiment of the present invention each VRAM 25 bank has its own page-hit logic within frame buffer controller 23. Thus each separate VRAM 25 memory bank is operated independently of the other VRAM 25 memory banks. Having separate page-hit logic for the separate VRAM banks improves the performance of scrolling or moving operations which typically consist of a sequence of read and write cycles from different parts of frame buffer memory. In a non-interleaved memory structure these types of operations would cause continual page misses because consecutive reads and writes would be from different pages. However, with a 4-way row-interleaved memory structure, a scrolling or moving operation performs reads and writes within separate VRAM banks on an average of 75% of the time (3 out of 4). And, because each VRAM bank has its own page-hit logic, in-page hits would occur on an average of 75% of the time (3 out of 4), resulting in significantly improved average performance for these frame buffer memory access bandwidth bound operations. Note that the larger the number of separate display memory banks the greater the odds of sustaining in-page hits and avoiding in-page misses because of the greater odds of not impacting a given display line of display means 21 and hence page of VRAM 25 (although the benefit of larger numbers of separate display memory banks is offset, at some point, by greater addressing requirements).

The following table indicates the number of clock cycles used by a sample 25 Megahertz (MHz) processor to read data from or write data to VRAM.

| Operation Type | Single Read | Single Write |
|---|---|---|
| isolated transaction (RAS not precharged; 2 clock cycle penalty) | 8 | 7 |
| isolated transaction (RAS precharged) | 6 | 5 |
| in-page miss (2 clock cycle penalty) | 8 | 7 |
| in-page hit | 4 | 3 |

As can be seen by the above table, with in-page hits occurring on an average of 75% of the time in the preferred embodiment of the present invention, the average number of read clock cycles is 0.75(4)+0.25(8)=5 and the average number of write clock cycles is 0.75(3)+0.25(7)=4. This thus shows a 17% improvement (5 vs. 6) over the number of clock cycles required for an isolated read transaction and a 20% improvement (4 vs. 5) over the number of clock cycles required for an isolated write transaction. However, because scrolling and moving operations typically operate via a series of reads and writes, each isolated transaction must typically wait a RAS precharge time (which causes a 2 clock cycle penalty) due to the immediately preceding transaction. Thus, in the prior art, isolated transactions typically require 8 clock cycles for a read transaction and 7 clock cycles for a write transaction. Therefore, the present invention actually shows on average a 38% reduction (5 vs. 8) in clock cycles over the prior art for a read transaction and a 43% reduction (4 vs. 7) in clock cycles over the prior art for a write transaction.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An improved frame buffer in a computer system having a display means, said display means having multiple display lines, said improved frame buffer comprising:

a) multiple banks of display memory wherein each said display memory bank provides display data for a different non-contiguous set of said display lines of said display means; and, b) separate display memory access logic for each said display memory bank, wherein said separate display memory logic comprises:

i) means for decoding, in response to receiving a read or write command, a provided memory address and to provide a decoded row address and a decoded column address to one of said display memory banks; and ii) means for determining whether said decoded row address matches a previous decoded row address and accessing said display memory bank associated with said separate display memory access logic if said decoded row address matches said previous decoded row address.

2. The improved frame buffer of claim 1 wherein an Nth line of said non-contiguous display lines of said display means is driven by a memory bank M of said display memory banks, wherein M=(N modulo a total number of said display memory banks).

3. The improved frame buffer of claim 2 wherein there are four said display memory banks.

4. The improved frame buffer of claim 3 wherein each said display memory bank comprises 512K bytes.

5. The improved frame buffer of claim 4 wherein there are 480 said display lines of said display means.

6. The improved frame buffer of claim 5 wherein said display means comprises 640 display columns.

7. An improved frame buffer in a computer system having a display means, said display means having an X number of display rows, said improved frame buffer comprising a Y number of banks of display memory, wherein said improved frame buffer comprises:

i) means for decoding, in response to receiving a read or write command, a provided memory address and to provide a decoded row address and a decoded column address to one of said display memory banks;

ii) means for determining whether said decoded row address matches a previous decoded row address; and, iii) means for accessing a memory bank Z of said Y banks of display memory, wherein Z=(N modulo Y), if said decoded row address matches said previous decoded row address, and also when said computer system accesses said display memory associated With an Nth row of said X display rows of said display means.

8. An improved frame buffer access method in a computer system, said computer system comprising a processor, X banks of display memory means and a display means having Y display rows, said improved frame buffer access method comprising:

a) decoding, in response to receiving a read or write command, a provided memory address to provide a decoded row address and a decoded column address to one of said display memory banks;

b) determining whether said decoded row address matches a previous decoded row address; and c) if said decoded row address match said previous decoded row address, accessing a set of data corresponding to an Nth display row of said display means by accessing bank M of said X banks of display memory means, wherein M=(N modulo X).

9. A frame buffer access method in a computer system, the computer system having a display means, said display means having a plurality of display rows, and a plurality of memory means, with Y being the total number of said memory means in said computer system, said frame buffer access method comprising:

providing a plurality of memory banks;

decoding in response to receiving a read or write command a provided memory address, and generating a decoded row address signal and a decoded column address signal;

detecting whether said row address matches a previously decoded row address, wherein if a matching row address is detected, then providing said decoded column address to memory bank Z of said plurality of memory banks, wherein Z=(N modulo Y) with N corresponding to a current row number of said display means being accessed, and:

wherein if a matching row address is not detected, then providing said decoded row address to said memory bank Z.

* * * * *